United States Patent [19]

Narayan et al.

[11] 4,359,550

[45] Nov. 16, 1982

[54] POLYISOCYANURATE POLYMERS, DISPERSIONS, AND CELLULAR AND NON-CELLULAR POLYURETHANE PRODUCTS PREPARED THEREFROM

[75] Inventors: Thirumurti Narayan; Gerhard G. Ramlow, both of Grosse Ile; Peter T. Kan, Plymouth, all of Mich.

[73] Assignee: BASF Wyandotte Corporation, Wyandotte, Mich.

[21] Appl. No.: 225,934

[22] Filed: Jan. 19, 1981

[51] Int. Cl.$^3$ .................. C08G 18/79; C08K 5/06
[52] U.S. Cl. .................. 524/871; 252/182; 521/117; 521/160; 521/161; 521/902; 544/193; 544/221; 524/377; 524/386; 524/589; 524/726; 524/743; 524/751; 524/770; 528/49
[58] Field of Search ............ 521/902, 161, 160, 117; 544/193, 221; 252/182; 528/49; 260/33.2 R; 524/386, 589, 377, 751, 743, 726, 742, 770, 871

[56] References Cited

U.S. PATENT DOCUMENTS

| | | | |
|---|---|---|---|
| 3,278,492 | 10/1966 | Herbstman | 521/161 |
| 3,280,066 | 10/1966 | France et al. | 521/902 |
| 3,367,934 | 2/1968 | Tate et al. | 521/161 |
| 3,381,008 | 4/1968 | Steyermark | 544/221 |
| 3,759,916 | 9/1973 | Pitts et al. | 521/161 |
| 4,089,835 | 5/1978 | Koenig et al. | 524/377 |
| 4,092,275 | 5/1978 | Reischl et al. | 521/137 |
| 4,093,569 | 6/1978 | Reischl et al. | 521/137 |
| 4,115,373 | 9/1978 | Henes et al. | 528/73 |
| 4,184,990 | 1/1980 | Reischl et al. | 524/386 |
| 4,251,401 | 2/1981 | Reischl | 260/30.8 R |
| 4,255,569 | 3/1981 | Mueller et al. | 544/193 |

*Primary Examiner*—H. S. Cockeram
*Attorney, Agent, or Firm*—Norbert M. Lisicki

[57] ABSTRACT

Polyisocyanurate polymers are prepared by the polymerization of organic polyisocyanates in organic solvents employing trimerization catalysts. After deactivation of the catalysts and removal of the solvents, these polymers may be dispersed in polyols which are employed for the preparation of cellular and non-cellular polyurethane products displaying improved load bearing properties.

18 Claims, No Drawings

POLYISOCYANURATE POLYMERS, DISPERSIONS, AND CELLULAR AND NON-CELLULAR POLYURETHANE PRODUCTS PREPARED THEREFROM

BACKGROUND OF THE INVENTION

1. Field of the Invention

The present invention relates to polyisocyanurate polymers, to a process for the preparation thereof, and to cellular and non-cellular polyurethane products prepared from said polyisocyanurate compositions. More particularly, the invention relates to polyisocyanurate polymers, a process for their preparation, dispersions of said polymers in polyols, and to cellular and non-cellular polyurethane products prepared employing said dispersions.

2. Description of the Prior Art

The prior art generally teaches the preparation of isocyanurate-modified isocyanate products employing a variety of catalysts. Among these are U.S. Pat. No. 3,996,223 which teaches a process for preparing polyisocyanates containing isocyanurate structures by polymerization in the presence of a mixture of Mannich bases and carbamic acid esters. U.S. Pat. No. 3,645,979 teaches the use of an organic phosphine catalyst to prepare isocyanurate structures. U.S. Pat. No. 3,652,424 teaches a process for the preparation of polyisocyanate compositions containing 5 to 19 percent by weight toluene diisocyanate trimer employing catalysts of substituted guanidines and isobiguanides. U.S. Pat. No. 4,125,491 teaches the preparation of a composition of matter which consists of the reaction product of trimerized toluene diisocyanate with about 0.02 to 0.25 equivalent, based on free isocyanate groups, of an active hydrogen compound which may either be a secondary aliphatic monoamine containing 24 to 36 carbon atoms or a mixture of such amine with an aliphatic alcohol containing 12 to 24 carbon atoms and dispersed in a mixture of toluene and heptane. This patent further teaches the use of the dispersions as adhesives or surface coating compositions. Neither the dispersion in polyether polyol or polyester polyol nor polyurethane foam preparation using the dispersion of the instant invention are taught in this patent. None of the prior art teaches the preparation of polyisocyanurate polymer which may be readily dispersed in a polyol and subsequently employed for the preparation of cellular and non-cellular polyurethane products.

SUMMARY OF THE INVENTION

The present invention relates to dispersible polyisocyanurate polymer, a process for its preparation, dispersions of the polyisocyanurate polymer in polyols and the cellular and non-cellular polyurethane products prepared from these polyisocyanurate polyol dispersions.

DESCRIPTION OF THE PREFERRED EMBODIMENT

In accordance with the invention, polyisocyanurate polymers are prepared by polymerizing polyisocyanates in organic solvents using appropriate trimerization catalysts. After deactivating the trimerization catalyst these polyisocyanurate polymers are isolated from the solvent then dispersed in polyols. The dispersions of the polyisocyanurate polymers in polyols are then employed for the preparation of cellular and non-cellular polyurethane products. The polyisocyanurate polymers and dispersions thereof are prepared in the following manner; an organic polyisocyanate is polymerized in a suitable organic solvent to the desired level of free isocyanate (NCO) content by employing catalytic quantities of an isocyanurate-forming catalyst. The extent of polymerization is monitored by measuring the free NCO content of the polymerization mixture. The trimerization catalyst is deactivated and the polyisocyanurate solution is then added to a non-solvent such as hexane in order to precipitate out the polyisocyanurate polymer. The precipitated polyisocyanurate polymer is collected by filtration and subsequently dried. Other methods of removing the solvent such as stripping or spray drying may be employed. The polyisocyanurate polymer may then be dispersed into a polyol. The polyol dispersion is then be employed for the preparation of polyurethane compositions by processes well known to those skilled in the art.

More specifically, the polyisocyanurate polymer may be prepared by polymerizing a 5 to 50 percent solution of toluene diisocyanate in ethyl acetate or any other suitable solvent with catalytic quantities of a trimerization catalyst. The temperature of the mixture is maintained at about 50° C. for up to four hours at which time the free isocyanate (NCO) content of the reaction mixture is reduced by about 75 percent of the original value. Benzoyl chloride is then added to deactivate the trimerization catalyst. After maintaining the reaction temperature at 50° C. for about 15 minutes, the contents are cooled to room temperature and added to an excess of vigorously agitated hexane. The polyisocyanurate polymer is precipitated from solution, is collected by filtration, washed with hexane and dried. The preparation of diphenylmethane diisocyanate or polyphenylene polymethylene polyisocyanate polyisocyanurate powder, may be accomplished by the polymerization of the isocyanate in an organic solvent at about 50° C. for from three to four hours. The free NCO value of the isocyanate is reduced by about 75 percent of the original value. The polyisocyanurate polymer is precipitated from the solution, filtered off and dried.

The products of the invention may be represented by the following equation when the isocyanate used is difunctional. Comparable structures will be formed when tri-, tetra- and polyisocyanates are employed.

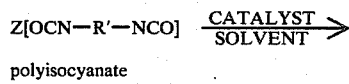

polyisocyanate

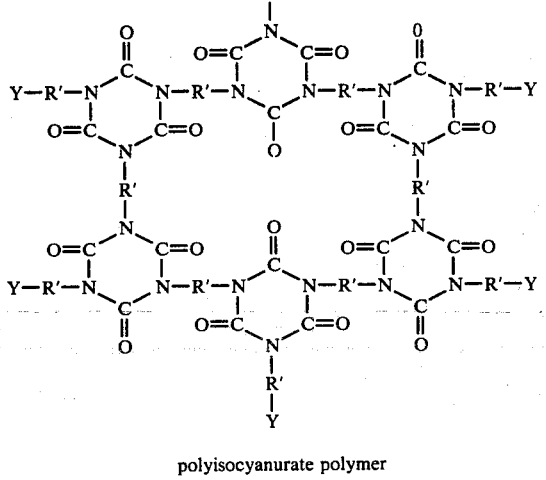

polyisocyanurate polymer wherein Z is at least 3 and Y is

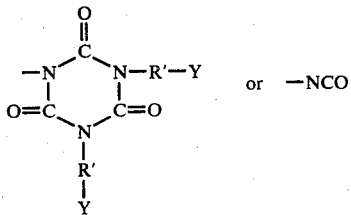   or   —NCO and wherein R' is as described hereinafter. Assuming that R' is

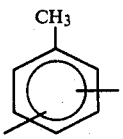

the resulting free NCO content decreases from 48.3 percent to about 8.0 for one of the polymers of this invention, and has an equivalent weight based on end group analysis of 522. The trimer of toluene diisocyanate has a free NCO content of 24.2 percent and an equivalent weight of 174. The equivalent weights of the polyisocyanurate polymers of the invention are greater than 174 and have a free NCO content of less than 24.2 percent. The preferred equivalent weights range from 210 to 4200 with free NCO contents ranging from about 1 to 20 percent based on the polymer weight.

The free NCO contents are determined by methods well known to those skilled in the art. These include the titration of a solution of the polyisocyanate compound with a solution of dibutylamine followed by back titration of the excess unreacted amine with an alcoholic HCL solution. The polyisocyanurate polymers are essentially free of the starting polyisocyanate monomer.

The dispersions of the subject polymers may be prepared by adding the finely divided free-flowing polyisocyanurate polymer into the polyol which is being stirred at a very rapid rate. During the mixing operation, the temperature of the dispersion is not allowed to increase above 100° C. The concentration of polyisocyanurate polymer dispersed in the polyol may range from 1 to 80 percent by weight, preferably from 5 to 50 percent by weight. The dispersions may also be carried out employing mechanical dispersing equipment such as ball mills, bead mills and the like. Preferably, ball shaped grinding elements made of glass, ceramic material, metal or hard abrasion resistant plastics such as polyamides may be employed.

The organic polyisocyanate employed in the instant invention corresponds to the formula R'(NCO)z where R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyantooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl)sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4"-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

The polyisocyanurate polymers of the instant invention may be prepared by employing well-known compounds as trimerization catalysts. Examples of these catalysts are (a) organic strong bases, (b) tertiary amine co-catalyst combinations, (c) Friedel Craft catalysts, (d) basic salts of carboxylic acids, (e) alkali metal oxides, alkali metal alcoholates, alkali metal phenolates, alkali metal hydroxides and alkal metal carbonates, (f) onium compounds from nitrogen, phosphorus, arsenic, antimony, sulfur and selenium, and (g) mono-substituted monocarbamic esters. These include 1,3,5-tris(N,N-dialkylaminoalkyl)-s-hexahydrotriazines; the alkylene oxide and water additives of 1,3,5-tris(N,N-dialkylaminoalkyl)-s-hexahydrotriazines; 2,4,6-tris(dimethylaminoemethyl)phenol; ortho, para- or a mixture of o- and p-dimethylaminomethyl phenol and triethylenediamine or the alkylene oxide and water additives thereof, metal carboxylates such as lead octanoate, sodium and potassium salts of hydroxamic acid, and organic boron-containing compounds. Monofunctional alkanols containing from 1 to 24 carbon atoms, epoxides containing 2 to 18 carbon atoms and alkyl carbonates may be used in conjunction with tertiary amine to accelerate the rate of the polymerization reaction. The concentration of trimerization catalysts that may be employed in the present invention is from 0.001 parts to 20 parts of catalyst per 100 parts of organic polyisocyanate. The temperature ranges which may be employed for the trimerization reaction may range from 25° C. to 230° C., preferably from 25° C. to 120° C.

The trimerization catalysts may be deactivated employing an acid or an acid chloride. The acids such as hydrochloric acid, sulfuric acid, acetic acid, oxalic acid, phosphonic acid, methanesulfonic acid, trifluoromethanesulfonic acid, benzene-, toluene-or xylenesulfonic acids, acid chlorides such as acetyl or benzoyl chloride, and sulfonyl chlorides such as benzene, toluene or xylene sulfonyl chloride may be employed. Another series of deactivators which are alkylating agents such as dimethyl sulfate, o, or p-alkyl toluenesulfonates, and methyl chloride may also be employed.

The solvents which may be employed are those in which the organic polyisocyanates are soluble. These include, for example, acetone, acetonitrile, acetophenone, allyl acetate, benzyl cellosolve, bromobenzene, o-bromostyrene, o-bromotoluene, p-bromotoluene, butyl acetate, secbutyl acetate, butyl benzoate, butyl cellosolve acetate, n-butylcyclohexane, carbon tetrachloride, cellosolve acetate, 2-chloro-1,3-butadiene, chloroform, cyclohexane, cyclohexanone, dibutyl cellosolve, dibutyl maleate, dibutyl phthalate, o-dichlorobenzene, m-dichlorobenzene, p-dichlorobenzene, 1,1-dichloroethane, dichloromethane, 1,1-diethoxybutane, 1,1-diethoxyethane, diethyl cellosolve, diethyl maleate, diethyl phthalate, diethyl pimelate, diethyl succinate, diglycol diacetate, 1,3-dimethoxybutane, 1,1-dimethoxyethane, 3,3-dimethyl-2-butanone, 3,3-dimethylbutyl acetate, dimethyl cellosolve, dimethyl phthalate, dimethyl pimelate, 2,5-dimethyltetrahydrofuran, 1,4-dioxane, 1,3-dioxolane, diphenyl ether, ethyl acetate, ethyl acrylate, ethyl butyrate, diethyl ether, ethyl formate, 2-ethylhexyl acetate, ethyl propionate, m-ethyltoluene, o-ethyltoluene, p-ethyltoluene, glyceryl triacetate, glycol diacetate, glycol dipropionate, 2-heptanone, 3-heptanone, 4-heptanone, 3-hepten-2-one, 2-heptyl acetate, 3-heptyl acetate, hexyl acetate, hexyl acrylate, hexylene glycol diacetate, hexyl hexanoate, methyl cellosolve acetate, 5-methyl-2-hexanone, methyl propionate, 3-methylthiophene, 2-methylthiophene, 2-octanone, 3-pentanone, phenyl cellosolve acetate, propyl acetate, propylene dichloride, toluene, 1,1,2-trichloroethane, trichloroethylene, 1,2,3-trichloropropane, m-xylene, o-xylene, p-xylene, dimethyl formamide, dimethyl acetamide, dimethyl sulfoxide, N-methyl pyrrolidone, tetramethylene sulfone. Precipitating non-solvents which may be employed are: decane, 2,2-dimethylbutane, 2,3-dimethylbutane, 2,2-dimethylhexane, 2,3-dimethylhexane, 3,3-dimethylhexane, 3,4-dimethylhexane, 2,5-dimethylhexane, 2,2-dimethylpentane, 2,3-dimethylpentane, 2,4-dimethylpentane, 3,3-dimethylpentane, 2,2-dimethylpropane, ethylcyclohexane, ethylcyclopentane, 3-ethylhexane, heptane, 1-heptene, 3-heptene-2-one, 2-methylheptane, 3-methylheptane, 4-methylheptane, 2-methylhexane, 3-methylhexane, 2-methylpentane, 3-methylpentane, 4-methyl-2-pentene, octane, 1-octene, and pentane.

In accordance with the present invention, rigid, flexible and microcellular foams may be prepared by catalytic reaction of organic polyisocyanates with polyols containing therein the dispersed polyisocyanurate polymer in the presence of blowing agents, surfactants and other additives which may be deemed necessary. Noncellular products may also be prepared in the absence of blowing agents.

Typical polyols which may be employed in the preparation of the foams of the instant invention include polyhydroxyl-containing polyesters, polyoxyalkylene polyether polyols, polyhydroxy-terminated polyurethane polymers, polyhydroxy-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly- 1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and Encyclopedia of Chemical Technology, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylenediamine, 1,3-diaminopropane, 1,3-diaminobutane, and 1,4-diaminobutane.

The polyurethane foams of the present invention may also be prepared by reacting organic polyisocyanates with a graft polymer polyol containing therein the dispersed polyisocyanurate powder of the invention in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Reissue Pat. No. 24,514 together with suitable machinery to be used in conjunction therewith. For the preparation of microcellular foams, blowing agents are generally not necessary. If desired for more expanded foams, they may be employed. When water is used, corresponding quantities of excess isocyanate to react with the water and produce carbon dioxide are necessary.

It is possible to proceed with the preparation of the polyurethane plastics by a prepolymer technique wherein an excess of organic polyisocyanate is reacted in a first step with the polyol containing the polyisocyanurate dispersion to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptens; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst for the polyurethane formation may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin di-2-ethyl hexanoate and stannous octoate, as well as other organo metallic compounds such as are disclosed in U.S. Pat. No. 2,846,408.

If desired, a surface-active agent may be employed. Numerous surface-active agents have been found satisfactory. Nonionic surface-active agents are preferred. Of these, the nonionic surfact-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

In the following examples, all parts are by weight unless otherwise designated and the following abbreviations are employed.

MDI—diphenylmethane diisocyanate

Crude MDI-Polymethylene polyphenylene polyisocyanate.

TDI—80/20; 2,4-, 2,6-toluene diisocyanate.

TDH—1,3,5-tris(N,N-dimethylaminopropyl)-s-hexahydrotriazine.
Polyol A—Ethylene oxide capped trimethylolpropane propylene oxide polyol having a hydroxyl number of 33.
Polyol B—Allyl glycidyl ether-modified ethylene oxide capped glycerine propylene oxide polyether polyol having an hydroxyl number of 33.
Polyol C—Oxypropylated glycerine having a hydroxyl number of 58.
Polyol D—Ethylene oxide capped glycerine polyol having a hydroxyl number of 33.
DABCO WT—Delayed action triethylene diamine catalyst.
DABCO 33 LV—A 66 percent solution of triethylene diamine in dipropylene glycol.
L 6202—Silicone surfactant.
T-9—Stannous 2-ethylhexanoate.
T-12—Dibutyltin dilaurate.
ILD—Indented load deflection.
CLD—Compression load deflection.
PI—polyisocyanurate.

EXAMPLES 1–8

Preparation of TDI Polyisocyanurate Powder

In a suitable reaction vessel equipped with a reflux condenser, inlet for nitrogen gas, addition funnel, and a mechanical stirrer, the indicated amount of ethyl acetate and the catalyst TDH were placed, and TDI was added dropwise. At the conclusion of the addition, an increase in the reaction temperature to 48° C. was indicated. Thereafter, the reaction temperature was maintained at 50° C. for 3.5 to 4 hours at which time the isocyanate value of the raction mixture dropped to about 3.5 percent. Equal parts of benzoyl chloride to that of TDH was then added to deactivate the catalyst. After maintaining the reaction temperature at 50° C. for another fifteen minutes, the contents were cooled to room temperature, and added in portions to a four-fold excess of vigorously agitated hexane. The precipitate formed was collected by filtration, washed with hexane and dried. The NCO content of the solid product was then determined. A summary of a number of preparations made employing the above procedure is shown in Table I. The percent yield of isocyanate powder is based on weight of monomeric polyisocyanate employed as the starting material.

TABLE I

| Example | Isocyanate Parts | Catalyst Parts | Solvent Parts | Polyisocyanurate Powder Yield, % | NCO, % |
|---|---|---|---|---|---|
| 1 | 87.0 | 0.4 | 250 | 81 | 10.6 |
| 2 | 87.0 | 0.4 | 250 | 98 | 10.0 |
| 3 | 87.0 | 0.4 | 250 | 97 | 9.9 |
| 4(1) | 87.0 | 0.4 | 250 | 100 | 9.9 |
| 5 | 348.0 | 1.6 | 1000 | 100 | — |
| 6 | 348.0 | 1.6 | 1000 | 100 | — |
| 7 | 348.0 | 1.6 | 1000 | 100 | — |
| 8(2) | 62.5 | 0.6 | 250 | 97 | 8.5 |

(1)2,4-toluene diisocyanate was employed as the starting polyisocyanate.
(2)Solvent employed was tetrahydrofuran.

EXAMPLES 9–13

Preparation of MDI Polyisocyanurate Powder

In a suitable reaction vessel equipped as above with the exception of the addition funnel, a solution of pure MDI or crude MDI (Example 12) in the respective solvent was prepared and TDH catalyst was added. Thereafter, the reaction contents were maintained at 50° C. for the indicated amount of time period. The solids precipitated were collected by filtration, washed with cyclohexane and dried. A summary of a number of preparatiions made employing the above procedure is presented in Table II.

TABLE II

| Example | Isocyanate Parts | Catalyst Parts | Solvent Parts | Polyisocyanurate Powder Yield, % | NCO, % |
|---|---|---|---|---|---|
| 9(1) | 62.5 | 0.6 | 250 | 97 | 8.1 |
| 10(1) | 625.0 | 6.0 | 2500 | 99 | 5.9 |
| 11(1) | 62.5 | 0.37 | 250 | 56 | 5.8 |
| 12(3) | 67.5 | 0.6 | 200 | 86 | 10.6 |
| 13(2) | 250 | 1.48 | 1000 | 66 | — |

(1)Solvent employed was cyclohexane.
(2)Solvent employed was ethyl acetate.
(3)Solvent employed was carbon tetrachloride.

Examples 8 and 9 had 0.1 equivalent of Neudol 25 ($C_{13}H_{27}OH$) per equivalent of NCO added to the reaction mixture prior to the polymerization reaction.

EXAMPLES 14–27

Examples 14–27 were prepared by the addition of the polyisocyanurate powder, prepared from TDI, into the designated polyol at the indicated solids concentration. The mixtures were then mixed at high speeds employing a Waring blender. The resulting viscosities varied as shown. The details are tabulated in Table III.

TABLE III

| Example | Polyisocyanurate Powder (parts) | Polyol (parts) | Polymer % | Viscosity cps 25° C. |
|---|---|---|---|---|
| 14 | 40 | A (360) | 10 | 2,750 |
| 15 | 80 | A (320) | 20 | 4,950 |
| 16 | 80 | A (320) | 20 | 6,450 |
| 17 | 40 | B (360) | 10 | 1,980 |
| 18 | 80 | B (320) | 20 | 6,800 |
| 19(1) | 80 | B (320) | 20 | 5,550 |
| 20 | 80 | B (320) | 20 | 5,750 |
| 21 | 80 | B (320) | 20 | 4,850 |
| 22 | 80 | B (320) | 20 | 6,200 |
| 23 | 80 | B (320) | 20 | 2,850 |
| 24(1) | 80 | B (320) | 20 | 3,075 |
| 25 | 80 | C (320) | 20 | 1,180 |
| 26 | 90 | D (210) | 30 | 3,200 |
| 27 | 150 | D (150) | 50 | 28,750 |

(1)8 parts Neudol 25 added during the preparation of the dispersion.

EXAMPLE 28

A solution of 100 parts of TDI in 200 grams of ethyl acetate in the presence of 0.36 part TDH as catalyst was reacted for 1.5 hours at 50° C. At the completion of this time, 0.36 part benzoyl chloride was added to neutralize the TDH. The solution was added to Polyol C and the ethyl acetate solvent was stripped off. The resulting dispersion containing 20 percent solids and had a viscosity at 25° C. of 6480 cps.

EXAMPLES 29–30

Hot cure flexible foam using the Polyol C polyisocyanurate dispersions of (Table III) was prepared employing the following method:

The polyisocyanurate dispersion (300 g.), 9.0 ml. of distilled water, 3.0 ml. of DC-192, and 0.90 ml. of DABCO 33 LV were mixed for 30 seconds; thereafter, 0.6 ml. of stannous octanoate (T-9) was added and mixed for another 15 seconds using LIGHTIN Model V-7 stirrer as mentioned above. TDI, 113.5 g. (80/20 2,4-, 2,6-isomer mixture) was then added to the polyol-catalyst blend and vigorously mixed for 5 seconds and poured into a one-gallon "cake-box" and the foam was allowed to rise therein. Thereafter, the foam was cured in a 120° C. oven for 5 minutes. A comparative foam was also made using Polyol C instead of the polyisocyanurate dispersion. As indicated by the ILD and CLD data, the foam prepared using the polyisocyanurate dispersion displayed superior load bearing properties compared to the foam prepared using Polyol C.

TABLE IV

| Dispersion or polyol | 300.0 parts |
|---|---|
| Distilled water | 9.0 parts |
| L-6202 | 3.0 parts |
| DABCO 33LV | 0.9 part |
| T-9 | 0.6 part |
| TDI | 105 index |

| | Example | |
|---|---|---|
| | 29 | 30 |
| Polyol | C | Dispersion of Example 25 |
| Foam Properties | | |
| Density, pcf. | 1.83 | 1.79 |
| Tensile strength, psi. | 17.5 | 15.6 |
| Elongation, % | 233.0 | 117.0 |
| Tear strength, pi. | 2.1 | 1.3 |
| ILD, psi. | | |
| sample thickness, in. | 1.00 | 1.00 |
| load at 50% defl. | 1.5 | 2.0 |
| CLD, psi. | | |
| load at 50% defl. | 0.42 | 0.81 |
| 65% | 0.59 | 1.10 |
| Compression set, % | | |
| 50% compr. | 2.9 | 6.5 |
| Air flow, cfm. at 0.5" water | 2.25 | 0.58 |

EXAMPLES 31-38

The polyisocyanurate polyol dispersion, distilled water, surfactant, and DABCO WT catalyst were mixed for thirty seconds using a LIGHTIN Model V-7 stirrer equipped with a 1½ inch shrouded mixing blade. Dibutyltin dilaurate (T-12) was then added and mixed for another 15 seconds. The polyisocyanate, a mixture of 80 parts TDI and 20 parts of crude MDI, was added, and mixed for 5 seconds. Thereafter, the mixture was poured into a one-gallon, square cardboard box and the foam was allowed to rise therein. The foam was then cured further in an oven for 8 minutes at 110° C. The detailed formulation data and the properties of the foams prepared using the dispersions of the invention are shown in Table V.

TABLE V

| Foam Formulation: | |
|---|---|
| Polyol | 300 parts |
| Water | 9 parts |
| DABCO WT | 2.1 parts |
| DBTDL | 0.1 part |
| L-5303 | 4.0 parts |
| TDI/Crude MDI | According to index shown below |

| | Example | | | |
|---|---|---|---|---|
| | 31 | 32 | 33 | 34 |
| Dispersion of Example | 14 | 15 | 15 | 16 |
| Soldis, % | 10 | 20 | 20 | 20 |
| Isocyanate index | 102.2 | 102.7 | 102.7 | 102.7 |
| Foam Properties | | | | |
| Density, pcf. | 1.84 | 1.74 | 1.84 | 1.94 |
| Tensile strength, psi. | 10.4 | 12.7 | 14.4 | 14.3 |
| Elongation, % | 117 | 83 | 97 | 90 |
| Tear strength, pi. | 1.1 | 0.9 | 0.9 | 0.9 |
| ILD, lb./sq.in. | | | | |
| Thickness, in. | 1.00 | 1.00 | 1.00 | 1.00 |
| load at 25% defl. | 0.4 | 0.7 | 0.6 | 0.7 |
| 50% | 0.8 | 1.3 | 1.2 | 1.4 |
| 65% | 1.2 | 1.9 | 1.7 | 2.0 |
| 25% return | 0.4 | 0.6 | 0.5 | 0.6 |
| Sag factor | 2.86 | 2.67 | 2.78 | 2.75 |
| Guide factor | 0.2 | 0.4 | 0.3 | 0.4 |
| Recovery, % | 83.7 | 80.0 | 81.0 | 78.1 |
| CLD, psi. | | | | |
| load at 50% defl. | 0.32 | 0.35 | 0.43 | 0.5 |
| Compression set, % | | | | |
| 50% compr. | 7.3 | 8.3 | 7.1 | 8.0 |
| Air flow, cfm. at 0.5" H$_2$O | 1.9 | 2.05 | 1.7 | 1.83 |

EXAMPLE 35

| MDI Polyisocyanurate Powder and Dispersion Prepartion | |
|---|---|
| Ethyl acetate | 100.0 parts |
| MDI | 250.0 parts |
| TDH | 1.48 parts |
| Reaction time hr./temp. °C. | 4 hr./50 |
| Benzoyl chloride, catalyst deactivator | 1.48 parts |
| Yield of Powder | 166.0 parts (66%) |
| Dispersion Preparation | |
| MDI, PI powder | 80.0 parts |
| Polyol B | 320.0 parts |
| Viscosity of dispersion, cps, 25° C. | 3,800 cps |
| Foam Formulation: | |
| Polyol | 300 g. |
| Water | 9 ml. |
| DABCO WT | 2.1 ml. |
| DBTDL | 0.1 ml. |
| L-5303 | 4.0 ml. |
| TDI/Crude MDI (80/20) | 105 Index |
| Foam Properties: | | |
| Density | 1.86 | 1.80 |
| Tensile Strength, psi. | 12.7 | 14.4 |
| Elongation, % | 90 | 90 |
| Tear Strength, pi. | 0.6 | 0.7 |
| ILD (lb/sq. inch) - Sample thickness (inches) | 1.00 | 1.00 |
| Load at 50% defl. | 1.4 | 1.3 |
| Compression set, % | | |
| 50% compression | 16.7 | 15.0 |
| Air flow, cfm at 0.5 inch water | 0.93 | 0.83 |

EXAMPLES 36-39

Examples 37, 38, and 39 were prepared from dispersions 17, 18 and 19. The properties of the foams prepared using the aforementioned Table IV formulations are compared with the properties of a foam preparing using Polyol B, Example 36. The foams prepared using the dispersions of the present invention indicate enhanced physical properties.

| | Example | | | |
|---|---|---|---|---|
| | 36 | 37 | 38 | 39 |
| Dispersion of Example | — | 17 | 18 | 19 |
| Solids % | None | 10 | 20 | 20 |

-continued

| | Example | | | |
|---|---|---|---|---|
| | 36 | 37 | 38 | 39 |
| Properties | | | | |
| Density, pcf. | 1.83 | 2.03 | 1.89 | 1.90 |
| Tensile Strength, psi. | 10.4 | 26.9 | 23.0 | 26.1 |
| Elongation, % | 153 | 123 | 103 | 113 |
| Tear Strength, pi. | 1.0 | 2.4 | 1.8 | 1.9 |
| ILD, lb./sq. in. | | | | |
| Thickeness, in. | 1.00 | 1.00 | 1.00 | 1.00 |
| Load at 50% Defl. | 0.9 | 1.1 | 1.5 | 1.5 |
| CLD, psi | | | | |
| Load at 50% Defl. | 0.21 | 0.48 | 0.58 | 0.61 |
| Compression sets | | | | |
| % set at 50% compression | 15.3 | 7.0 | 9.1 | 9.1 |
| Airflow, cfm. at 0.5" $H_2O$ | 1.24 | 4.2 | 4.1 | 4.0 |

The embodiments of the invention in which an exclusive privilege or property is claimed are defined as follows:

1. A process for preparing a polyisocyanurate polymer dispersion by (a) polymerizing a solution of an organic polyisocyanate in an organic solvent in the presence of an effective amount of a trimerization catalyst, (b) deactivating said catalyst, (c) isolating said polymer from said solvent, and (d) dispersing said polymer in a polyol.

2. The dispersion of claim 1 wherein said polymer is isolated by the addition of a non-solvent and precipitated from solution.

3. The dispersion of claim 1 wherein said organic polyisocyanate is selected from the group consisting of 2,4-toluene diisocyanate, 2,6-toluene diisocyanate, crude toluene diisocyanate, 2,4'-diphenylmethane diisocyanate, 4,4'-diphenylmethane diisocyanate, hydrogenated diphenylamine diisocyanate and polymethylene polyphenylene polyisocyanate and mixtures thereof.

4. The dispersion of claim 1 wherein the organic solvent is selected from the group consisting of toluene, ethyl acetate, cyclohexane, tetrahydrofuran, carbon tetrachloride, tetramethylenesulfone, N-methylpyrrolidone, dimethylformamide, dimethyl acetamide, dimethyl sulfoxide, and acetone.

5. The dispersion of claim 1 wherein the free isocyanate content after polymerization is less than 24.2 percent based on the polymer weight.

6. The dispersion of claim 1 wherein the free isocyanate content after polymerization is from 1 to 16 percent based on the polymer weight.

7. In a polyurethane foam prepared by the reaction of a polyol, an organic polyisocyanate, catalyst, blowing agents and optionally other additives, the improvement comprising employing as the polyol component the polymer dispersion of claim 1.

8. In a polyurethane foam prepared by the reaction of a polyol, an organic polyisocyanate, catalyst, blowing agents and optionally other additives, the improvement comprising employing as the polyol component the polymer dispersion of claim 2.

9. In a polyurethane foam prepared by the reaction of a polyol, an organic polyisocyanate, catalyst, blowing agents and optionally other additives, the improvement comprising employing as the polyol component the polymer dispersion of claim 3.

10. In a polyurethane foam prepared by the reaction of a polyol, an organic polyisocyanate, catalyst, blowing agents and optionally other additives, the improvement comprising employing as the polyol component the polymer dispersion of claim 4.

11. In a polyurethane foam prepared by the reaction of a polyol, an organic polyisocyanate, catalyst, blowing agents and optionally other additives, the improvement comprising employing as the polyol component the polymer dispersion of claim 5.

12. In a polyurethane foam prepared by the reaction of a polyol, an organic polyisocyanate, catalyst, blowing agents and optionally other additives, the improvement comprising employing as the polyol component the polymer dispersion of claim 6.

13. In a non-cellular polyurethane product prepared by the reaction of a polyol, an organic polyisocyanate, catalyst, and optionally other additives, the improvement comprising employing as the polyol component the polymer dispersion of claim 1.

14. In a non-cellular polyurethane product prepared by the reaction of a polyol, an organic polyisocyanate, catalyst, and optionally other additives, the improvement comprising employing as the polyol component the polymer dispersion of claim 2.

15. In a non-cellular polyurethane product prepared by the reaction of a polyol, an organic polyisocyanate, catalyst, and optionally other additives, the improvement comprising employing as the polyol component the polymer dispersion of claim 3.

16. In a non-cellular polyurethane product prepared by the reaction of a polyol, an organic polyisocyanate, catalyst, and optionally other additives, the improvement comprising employing as the polyol component the polymer dispersion of claim 4.

17. In a non-cellular polyurethane product prepared by the reaction of a polyol, an organic polyisocyanate, catalyst, and optionally other additives, the improvement comprising employing as the polyol component the polymer dispersion of claim 5.

18. In a non-cellular polyurethane product prepared by the reaction of a polyol, an organic polyisocyanate, catalyst, and optionally other additives, the improvement comprising employing as the polyol component the polymer dispersion of claim 6.

* * * * *